United States Patent [19]

Dulger

[11] Patent Number: 5,588,339
[45] Date of Patent: Dec. 31, 1996

[54] ADJUSTABLE STROKE DRIVE FOR A DISPLACEMENT PISTON PUMP

[75] Inventor: Viktor Dulger, Heidelberg, Germany

[73] Assignee: ProMinent Dosiertechnik GmbH, Heidelberg, Germany

[21] Appl. No.: 285,957

[22] Filed: Aug. 4, 1994

[30] Foreign Application Priority Data

Aug. 7, 1993 [DE] Germany .......................... 43 26 621.5
Sep. 28, 1993 [DE] Germany .......................... 43 32 947.0

[51] Int. Cl.⁶ .................................................. F16H 21/20
[52] U.S. Cl. .......................... 74/836; 74/571 M; 464/104
[58] Field of Search ................................. 74/836, 571 M, 74/831; 464/102, 104

[56] References Cited

U.S. PATENT DOCUMENTS

| | | | |
|---|---|---|---|
| 739,773 | 9/1903 | Arnold | 74/836 |
| 1,892,504 | 12/1932 | Davis, Jr. | 74/836 |
| 2,834,223 | 5/1958 | Strnad | 74/571 M |
| 4,022,082 | 5/1977 | Uchimoto | 74/836 |
| 4,440,123 | 4/1984 | Tsai | 464/104 |
| 5,226,852 | 7/1993 | Asaba et al. | 464/104 |

FOREIGN PATENT DOCUMENTS

| | | |
|---|---|---|
| 40427 | 8/1965 | German Dem. Rep. . |
| 451826 | 11/1927 | Germany . |
| 1284788 | 12/1968 | Germany . |
| 1296922 | 6/1969 | Germany . |
| 1907349 | 1/1971 | Germany . |
| 2043827 | 3/1972 | Germany . |
| 3725900 | 8/1989 | Germany . |

*Primary Examiner*—Charles A. Marmor
*Assistant Examiner*—David Fenstermacher
*Attorney, Agent, or Firm*—Darby & Darby

[57] ABSTRACT

A stroke drive, particularly for displacement piston pumps, has a first eccentric (8) on which a second eccentric (9) is mounted. A push rod bearing (10) is connected to the second eccentric (9). The eccentrics (8, 9) are connected to each other by way of an intermediate drive (17) which conveys a synchronous rotation to the eccentrics. An adjusting device (16) serves to change the relative position of the eccentricities (e1, e2) of the eccentrics (8,9) relative to each other. In this manner the length of the stroke is steplessly adjustable from a maximal value to a minimal value.

12 Claims, 2 Drawing Sheets

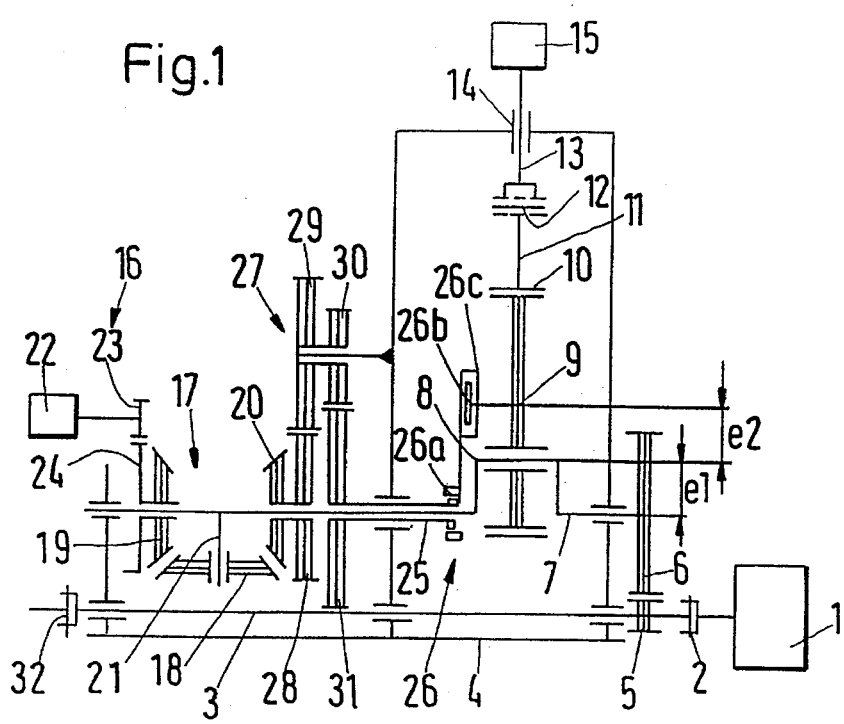
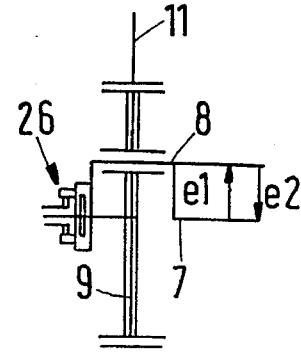
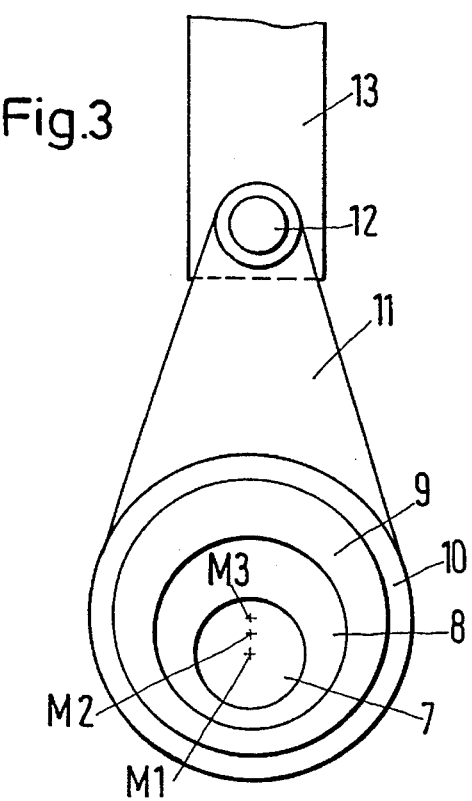
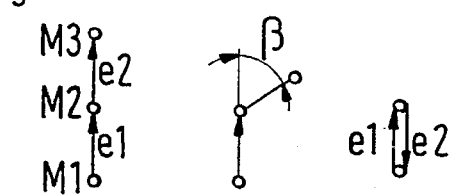
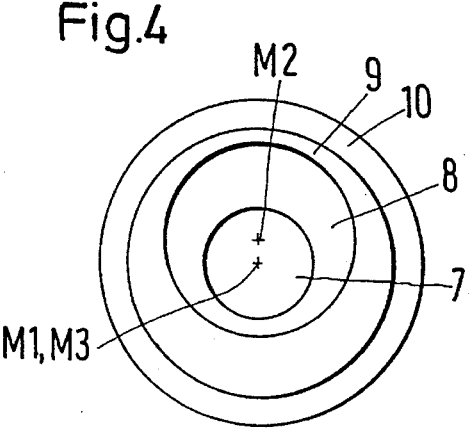

5,588,339

ADJUSTABLE STROKE DRIVE FOR A DISPLACEMENT PISTON PUMP

BRIEF DESCRIPTION OF THE INVENTION

The invention relates to a stroke drive; particularly for a displacement piston pump, having a drive shaft and a first, driven eccentric, a crank shaft having a support, and an articulated push element connected thereto and guided in a linear manner. A second eccentric is supported on the first eccentric and the crank shaft support is attached thereto. The eccentrics are connected to each other by means of an intermediate drive which confers a synchronous rotation and there is further provided an arrestable adjusting device for changing the eccentricities of the eccentrics relative to each other.

Such a stroke drive is known from DD-PS 40 427. In this known construction, the stroke can be adjusted in a stepless manner between a maximal value, which is equal to the sum of the eccentricities, and a minimal value which is equal to the sum of the difference of the eccentricities; it is merely necessary to change the angle formed by the eccentricities of both eccentrics. This can be achieved in a stepless manner during short-term deviations from a synchronous run, even while under operating and load conditions. This principle is applicable to any size of stroke drive.

The known intermediate drive includes a transfer sleeve having outer teeth cooperating with a hollow wheel fastened to the second eccentric. Such hollow wheels are expensive to manufacture. For an adjustable device, an adjust-wheel is used which axially adjusts a threaded sleeve, the threaded sleeve carrying an adjust-sleeve which in turn converts a stroke movement into a rotational movement for adjusting the second eccentric. This mandates the cooperation between self-blocking and easy-going threaded sections.

From DE-PS 37 25 900 and DE-PS 451 826 it is known to use a differential between two synchronously rotating eccentrics for adjusting purposes. In both instances, the second eccentric is provided with a hollow wheel.

From DE-AS 12 84 788 a stroke drive is known which does not require a hollow wheel. In this case, the intermediate drive consists of several toothed wheels meshing with each other, wherein the second eccentric meshes with an eccentrically circumferentially rotating toothed wheel. This arrangement also leads to operational difficulties. Furthermore, the eccentrics are not rotating synchronously, but oppositely to each other, which requires special supports.

It is an object of the present invention to develop a stroke device of a type, briefly described above, which in practice is especially suitable for its intended purpose.

This object is attained, according to the invention, with an intermediate drive which includes:

a) a differential having a first input connected to the first eccentric, an arrestable second input being connected to the adjusting device and having an output leading to the second eccentric, b) an axis-offset equalizing coupling connected with the second eccentric, c) a reduction drive between the first eccentric and the first input of the differential or between the output of the differential and the coupling, the reduction drive reducing the speed at a ratio of 2:1.

If one introduces a rotational movement at the second input of the differential, which could be a planetary gearing, this will have the effect of changing the relative position of the eecentricities. By using the axis off-set equalizing coupling, a hollow wheel at the second eccentric is avoided. The reduction drive is necessary for obtaining a synchronous run of both eccentrics.

When applied to displacement piston pumps, one obtains a steplessly adjustable feed volume, even when using a motor having a constant speed, which is less expensive than using a motor having variable speeds of rotation. The adjustable stroke drive can thereby be used to control or adjust the feed volume while the pump is in operation. This is especially valuable when dosing pumps are involved. This principle can be applied to large as well as small pumps.

It is advantageous that the coupling be a cross-shaft head coupling, otherwise known as an Oldham-coupling. The use of such a coupling results in an axially shortened construction. It is also advantageous that the angle between the eccentricities be adjustable at least between 0° and 180°. In this manner, the adjustable range, which is predetermined by the eccentricities, can be used to its fullest extent.

The possibility exists for the angle to be unidirectionally adjustable over 360°. Over the first 180°, a stroke shortening results, while over the second 180°, there is a lengthening of the stroke. Thereby, one can use a unidirectional and through-rotational adjusting mechanism; end abutments or safety switches which normally would inhibit an over adjustment of the adjusting device, are not needed.

Advantageously, the eccentricities of both eccentrics are of equal dimensions. In this manner, the stroke can be adjusted between a maximal value and zero.

In particular, the differential can be constructed of three bevel gears of which one is connected to an activating element for driving the adjusting device. As long as one bevel gear is at a stand-still, the other two will rotate around it synchronously. However, when adjusted by the activating element, a desired stroke adjustment occurs.

It is advantageous that the second eccentric be provided on the first eccentric in the form of a disc, the first eccentric having been formed as a crank journal and carrying at its circumference the crank shaft support. This also contributes to a shortened construction.

The construction can again be shortened when the disc itself is formed as a part of a cross-staff head coupling.

It is also advantageous that the adjusting device includes an adjustable motor. This allows for an automatic adjustment, for example, when the system is under the influence of a control or an adjusting device. With this in mind, one can use a simple or inexpensive motor having a unidirectional rotor.

The invention will hereinafter be explained in greater detail with its embodiments and in combination with the drawings.

BRIEF DESCRIPTION OF THE DRAWINGS

FIG. 1 is a schematic illustration of the invention stroke drive at its maximum stroke;

FIG. 2 is a partial illustration of the device of FIG. 1 at its minimum stroke;

FIG. 3 is an enlarged illustration of the cooperation between the eccentrics according to FIG. 1;

FIG. 4 is shows the cooperation between the eccentrics according to FIG. 2;

FIGS. 5–7 show the eccentricities in different positions;

DETAILED DESCRIPTION OF THE INVENTION

Figure 9:
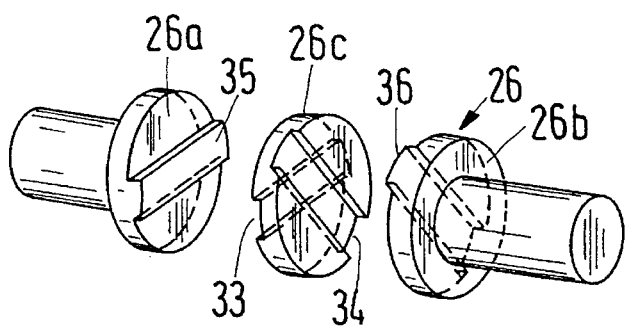
FIG. 9 shows the three parts of a known cross-staff head coupling.

In the embodiments shown in FIGS. 1 and 2, a motor 1 having a constant number of rotations drives a main shaft 3 via a coupling 2. The main shaft 3 is supported in housing 4 at several positions. A gear wheel 5 drives, through a further gear wheel 6, a crank shaft 7, whose crank forms a first eccentric 8 having an eccentricity e1. On this eccentric 8 a second eccentric 9, which has been formed as a disc, is supported; it has an eccentricity e2. A ring-like bearing 10 of a push rod 11 surrounds the circumference of the second eccentric 9. By means of a journal 12, the push rod 11 is articulately connected with a push element 13 guided axially in a sleeve 14. A push piston pump 15 is driven by the push element 13.

An arrestable adjusting device 16 interacts with an intermediate drive 17 which is a differential having three bevel gears 18, 19 and 20. The arrestable adjusting device can be arrested by way of friction, for example. The circumferentially rotating bevel gear 18 forms a first input and is moved by a radial journal 21 of crank shaft 7. The bevel gear 19 forms a second input which can be rotated by an electric control motor 22 through gear wheels 23 and 24. The control motor 22 can be activated by a controller or a process regulator and allows for delicate adjustments. The third bevel gear 20 forms an output which leads to the second eccentric 9 by way of an output shaft 25 and an axis off-set equalizing cross-staff head 26, whose parts 26a to 26c are shown only schematically. Between the bevel gear 20 and the output shaft 25 there is arranged a reduction drive 27 having four spur wheel gears 28, 29, 30, and 31. The reduction drive reduces the speed at a ratio of 2:1. This reduction drive compensates the overdrive created in the differential at a ratio of 1:2 between the first input and the output.

The intermediate drive assures that when the bevel gear 19 is held rotationally fast, the second eccentric 9 is rotating synchronously with the first eccentric 8, meaning they have the same speed and direction of rotation. When the control motor 22 is activated, while the drive motor is motionless, the second eccentric 9 rotates relative to the first eccentric 8, whereby the hereinafter described stroke adjustment takes place. When the control motor 22 is activated, and the drive motor is operating, the synchronous run is overridden by means of this adjustment.

As shown in FIG. 3, the crank shaft 7 has a middle axis M1, the first eccentric 8 has a middle axis M2, and the second eccentric has a middle axis M3. In the positions shown in FIGS. 1 and 3, the middle axes lie in a plane above each other, so that the eccentricities e1 and e2 formed between the middle axes will add up as is shown schematically in FIG. 5. When, by activating the control motor 22, the second eccentric 9 is rotated around the first eccentric 8, the angle between eccentricities e1 and e2 is changed, as is shown in FIG. 6. Thus, the effective stroke of push element 13 is shortened. In an extreme case, the second eccentric 9 assumes the positions shown in FIGS. 2 and 4. In this case, eccentricities e1 and e2 cancel each other when they have the same magnitude; when the drive motor is operating, no stroke of the push element is created. It is sufficient that the control motor 22 has a unidirectional rotating motor. If, for example, the control motor turns the bevel gear 19 by 360°, the angle β changes from 0° to 180°, and the stroke is diminished to zero. If bevel gear 19 is turned a further 360°, the angle β changes from 180° to 360° and the stroke is lengthened to its maximal extent.

By means of an additional coupling 32, a further shaft for a stroke drive of an additional displacement piston pump can be connected. In the embodiment shown in FIG. 8, corresponding parts have the same reference characters as used in FIGS. 1 to 4. There are provided the roller bearings for the crank shaft 7, the bevel gears 18 to 20, the gear wheels 28 to 31, the output shaft 25, as well as a bearing between the outer circumference of the eccentric 9 and the inner circumference of the ring-like support 10. The adjustable device 116 is, in this case, a rotational knob 122 which can be activated manually to directly influence the bevel gear 19.

Figure 8:
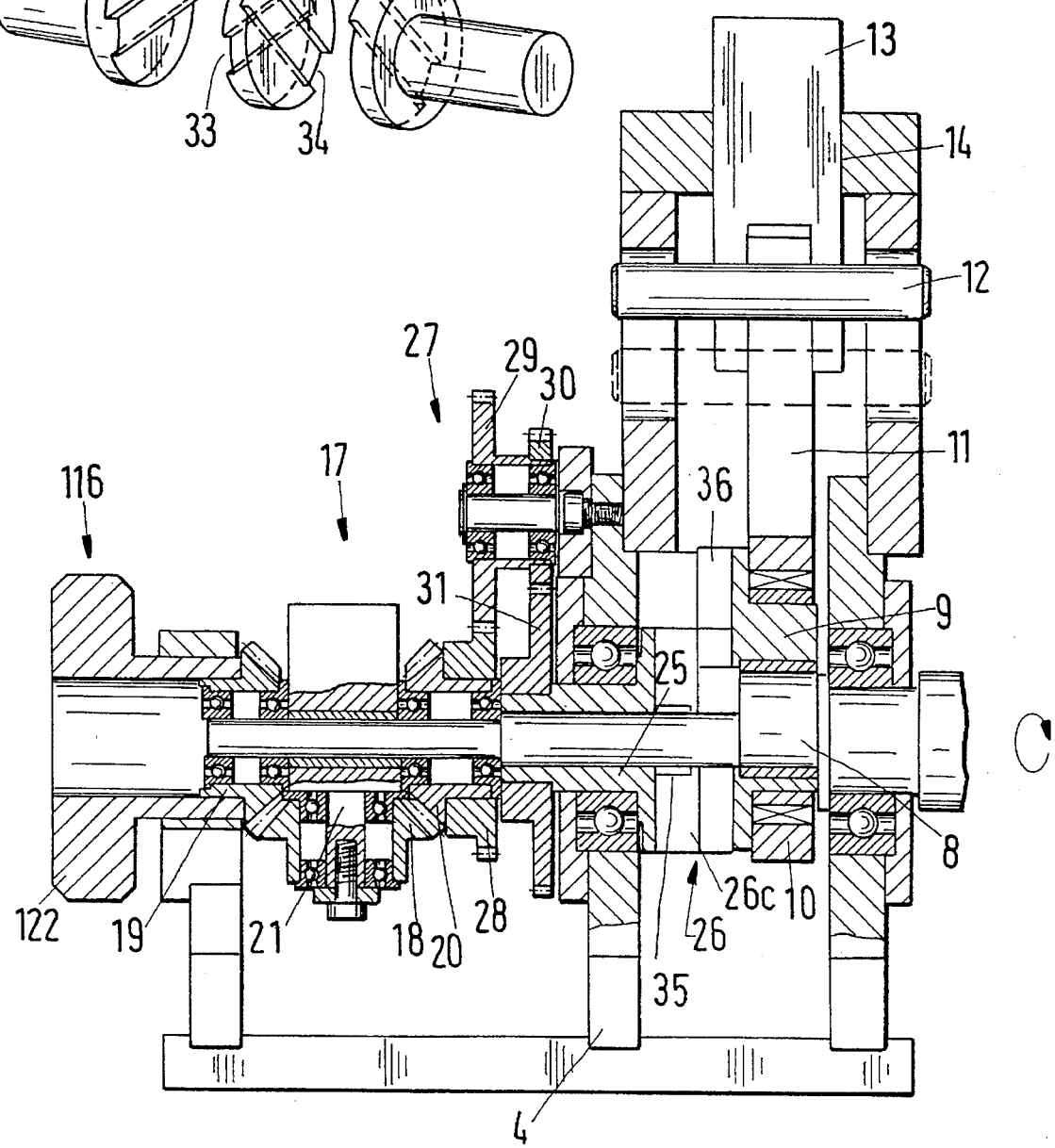
FIG. 8 is an embodiment of the invention in cross-section.

FIG. 9 shows the principle of a cross-staff head. A cross disc 26c has two slots 33 and 34 offset from each other by 90°, into which are inserted a rib 35 on coupling part 26a and a rib 36 on coupling part 26b, respectively. In FIG. 8, the second eccentric 9 itself is formed as part 26b of the cross-staff head. It is merely necessary to provide a corresponding rib 36 on the second eccentric.

Instead of constructing the intermediate drive with bevel gears, a different rotational drive can be used. For example, a planetary drive consisting of spur gear wheels can be used. Instead of a rotational knob 122, a lever can be fastened to bevel gear 19 or a worm drive having a hand crank can be provided.

What we claim is:

1. A stroke drive for a displacement piston pump, having a drive shaft, a first driven eccentric, a push rod with a support therefor and a push element articulately connected to said push rod and being guided in a linear manner, a second eccentric supported on said first eccentric and means for connecting said push rod support to said second eccentric, an intermediate drive for coupling said eccentrics to each other and for conveying a synchronous rotation thereto, and an arrestable adjusting device for changing the relative position of the eccentricities of the eccentrics relative to each other, wherein the intermediate drive includes:

a) a differential having a first bevel gear comprising a first input connected to said first eccentric, a second bevel gear comprising a second input connected to said adjusting device, and a third bevel gear comprising an output leading to said second eccentric, b) an axis off-set equalizing cross-shaft coupling connected to said second eccentric, and c) a reduction drive comprising of two pairs of spur gears disposed between the output of the differential and said coupling and reducing the speed at a ratio of 2:1, one of the spur gears of each of said two pairs of spur gears and said third bevel gear being coaxial with said drive shaft.

2. A stroke drive according to claim 1, wherein said coupling is a cross-staff head coupling.

3. A stroke drive according to claim 2, wherein an angle β between the eccentricities of said eccentrics is adjustable at least between 0° and 180°.

4. A stroke drive according to claim 1, wherein an angle β between the eccentricities of said eccentrics is adjustable at least between 0° and 180°.

5. A stroke drive according to claim 4, wherein the eccentricities of both eccentrics are of equal magnitude.

6. A stroke drive according to claim 4, wherein the angle β is unidirectionally adjustable over 360°.

7. A stroke drive according to claim 1, wherein the second eccentric is formed as a disc and is mounted on said first eccentric which has been formed as a crank journal, said disc carrying said push rod bearing at its circumference.

8. A stroke drive according to claim 7, wherein the second eccentric is formed as a part of the cross-staff head coupling.

9. A stroke drive according to claim 1, wherein the adjusting device includes a control motor.

10. A stroke drive according to claim 9, wherein said control motor includes a unidirectional rotor.

11. A stroke drive according to claim 1, wherein the differential includes three bevel gears, one of which is connected to an activating means.

12. A stroke drive for a displacement piston pump, having a drive shaft, a first driven eccentric, a push rod with a support therefor and a push element articulately connected to said push rod and being guided in a linear manner, a second eccentric supported on said first eccentric, the second eccentric being formed as a disc and being mounted on said first eccentric which has been formed as a crank journal, said disc carrying said push rod bearing at its circumference, the second eccentric being formed as a part of a cross-staff head coupling and means for connecting said push rod support to said second eccentric, an intermediate drive for coupling said eccentrics to each other and for conveying a synchronous rotation thereto, and an arrestable adjusting device for changing the relative position of the eccentricities of the eccentrics relative to each other, wherein the intermediate drive includes:

a) a differential having a first input connected to said first eccentric, a second input connected to said adjusting device, and an output leading to said second eccentric, and b) a reduction drive between the output of the differential and said coupling and reducing the speed at a ratio of 2:1.

\* \* \* \* \*

UNITED STATES PATENT AND TRADEMARK OFFICE
CERTIFICATE OF CORRECTION

PATENT NO. : 5,588,339
DATED : December 31, 1996
INVENTOR(S) : Viktor DULGER

It is certified that error appears in the above-indentified patent and that said Letters Patent is hereby corrected as shown below:

Title Page, Item [30], Foreign Application Priority Data, change "43 26 621.5" to --P 43 26 621.5--; and change "43 32 947.0" to --P 43 32 947.0--.

Signed and Sealed this

Eighth Day of April, 1997

Attest:

BRUCE LEHMAN

Attesting Officer     Commissioner of Patents and Trademarks